(12) United States Patent
Linnig (10) Patent No.: US 9,547,076 B2
(45) Date of Patent: Jan. 17, 2017

(54) ELEVATION MONOPULSE ANTENNA SYNTHESIS FOR AZIMUTH CONNECTED PHASE ARRAY ANTENNAS AND METHOD

(71) Applicant: Raytheon Company, Waltham, MA (US)

(72) Inventor: Michael J. Linnig, Allen, TX (US)

(73) Assignee: RAYTHEON COMPANY, Waltham, MA (US)

( * ) Notice: Subject to any disclaimer, the term of this patent is extended or adjusted under 35 U.S.C. 154(b) by 661 days.

(21) Appl. No.: 14/028,452

(22) Filed: Sep. 16, 2013

(65) Prior Publication Data

US 2015/0077286 A1  Mar. 19, 2015

(51) Int. Cl.
*G01S 13/44* (2006.01)
*G01S 13/02* (2006.01)
*G01S 13/06* (2006.01)
*H01Q 3/26* (2006.01)
*G01S 3/32* (2006.01)

(52) U.S. Cl.
CPC .............. *G01S 13/44* (2013.01); *G01S 13/02* (2013.01); *G01S 13/06* (2013.01); *G01S 13/4463* (2013.01); *H01Q 3/2605* (2013.01); *G01S 3/32* (2013.01)

(58) Field of Classification Search
CPC ...................................................... G01S 13/44
See application file for complete search history.

(56) References Cited

U.S. PATENT DOCUMENTS

| | | | | |
|---|---|---|---|---|
| 5,675,343 A * | 10/1997 | Champeau | ........... | H01Q 21/296 342/372 |
| 6,246,365 B1 | 6/2001 | Tokoro | | |
| 7,142,164 B2 * | 11/2006 | Legay | ...................... | H01Q 3/46 342/370 |
| 7,265,713 B2 * | 9/2007 | Lewis | .................... | H01Q 21/06 342/372 |
| 8,305,260 B2 * | 11/2012 | Shijo | ................... | G01S 13/4463 342/175 |
| 8,427,371 B2 * | 4/2013 | Pozgay | .............. | G01S 13/4463 342/373 |

(Continued)

FOREIGN PATENT DOCUMENTS

EP    1 726 972 A1    11/2006

OTHER PUBLICATIONS

Written Opinion of the International Searching Authority for International Application No. PCT/US2014/046646, filed Jul. 15, 2014, Written Opinion of the International Searching Authority mailed Oct. 31, 2014 (6 pgs.).

(Continued)

*Primary Examiner* — Matthew M Barker
(74) *Attorney, Agent, or Firm* — Lewis Roca Rothgerber Christie LLP (57) ABSTRACT

Embodiments of the present invention are directed to monopulse radar antenna synthesis and methods thereof. An antenna array includes a number of sub-arrays operatively arranged in a first direction (e.g., azimuth), and each of the sub-arrays includes a number of antenna elements grouped as a first group and a second group adjacent to each other in a second direction substantially perpendicular to the first direction. The antenna array can perform monopulse processing in the elevation direction by synthesizing two monopulse antennas by to form monopulse antennas with phase centers that differ in elevation.

22 Claims, 8 Drawing Sheets

(56) References Cited

U.S. PATENT DOCUMENTS

| | | | | |
|---|---|---|---|---|
| 8,432,307 | B2* | 4/2013 | Cornic | G01S 13/424 342/118 |
| 8,660,483 | B2* | 2/2014 | Tsuchida | H04B 7/0691 333/101 |
| 8,854,257 | B2* | 10/2014 | Hamner | G01S 7/03 342/147 |
| 2003/0085833 | A1 | 5/2003 | Yu | |
| 2007/0182619 | A1 | 8/2007 | Honda et al. | |
| 2010/0085237 | A1 | 4/2010 | Cornic et al. | |
| 2012/0154203 | A1 | 6/2012 | Vacanti et al. | |

OTHER PUBLICATIONS

International Search Report for International Application No. PCT/US2014/046646, filed Jul. 15, 2014, International Search Report dated Oct. 24, 2014 and mailed Oct. 31, 2014 (4 pgs.).

Liu, et al., "Review of Interferometric ISAR Imaging", Signal Processing, vol. 27, No. 5, May 25, 2011 (p. 737).

Ender, et al., "PAMIR—a wideband phased array SAR/MTI system", IEE Proceedings: Radar, Sonar & Navigation, Institution of Electrical Engineers, GB., vol. 150, No. 3, Jun. 2, 2003 (pp. 165-172).

Kostis, et al., "Interferometric Inverse Synthetic Aperture Radar", Proceedings of the London Communications Symposium 2005, Sep. 1, 2005 (4 pgs.).

Smith, et al., "A Synthetic Interferometric ISAR Technique for Developing 3-D Signatures", Aerospace Conference 2003, Proceedings, 2003 IEEE Mar. 8-15, 2003, Piscataway, NJ, IEEE, vol. 2, Mar. 8, 2003 (11 pgs.).

Felguera-Martin, et al., "Interferometric inverse synthetic aperture radar experiment using an interferometric linear frequency modulated continuous wave millimetre-wave radar", IET Radar, Sonar and Navigation, vol. 5, No. 1, Jan. 6, 2011, (pp. 39-47).

Given, et al., "Generalized ISAR—Part II Interferometric Techniques for Three-Dimensional Location of Scatters", IEEE Transactions on Image Processing, IEEE Service Center, Piscataway, NJ, vol. 14, No. 11, Nov. 1, 2007 (pp. 1792-1797).

Bertl, et al., "Broadband circular interferometric millimetre-wave ISAR for threat detection", Advanced in Radio Science, vol. 5, Jan. 1, 2007 (pp. 147-151).

Written Opinion of the International Searching Authority for International Application No. PCT/US2013/055009, filed Aug. 14, 2013, Written Opinion of the International Searching Authority mailed Oct. 22, 2013 (9 pgs.).

International Search Report for International Application No. PCT/US2013/055009, filed Aug. 14, 2013, International Search Report dated Oct. 15, 2013 and mailed Oct. 22, 2013 (4 pgs.).

* cited by examiner

ELEVATION MONOPULSE ANTENNA SYNTHESIS FOR AZIMUTH CONNECTED PHASE ARRAY ANTENNAS AND METHOD

CROSS REFERENCE TO RELATED APPLICATION

The present application may be related to U.S. patent application Ser. No. 13/654,206, filed on Oct. 17, 2012.

FIELD

Embodiments of the present invention relate to monopulse radar and method, and in particular, monopulse antenna synthesis and method.

BACKGROUND

While a typical radar beam is adequate for locating a target in an early warning role, it is generally not accurate enough for aiming a radar antenna to track the moving direction of the target. In some applications, the beam width of the radar beam can be reduced through the use of a larger antenna, but this is not often practical, for example, in airborne radar applications. One way to improve the performance of the radar is through monopulse processing.

In a typical monopulse radar, a radar beam is sent out of an antenna array, and the reflected signals of the radar beams are received separately in slightly different return paths, causing a difference in received phase. The received phase of the two returns are compared to each other, indicating the position of the reflecting target within the received beam. Thus, the general direction of the target relative to the boresight of the antenna can be determined during one pulse. In order to perform monopulse, an antenna is functionally split into two parts (antenna A and antenna B) that receive the reflected radar beams off the target at slightly different angles. In monopulse antennas generally known in the art, two outputs are created from the antennas A and B. One output is the sum of parts (A+B), and another output is the difference of parts (A−B). The sum and difference outputs are processed by a suitable processor (e.g., a computer, microprocessor, etc.) according to generally known monopulse processes to determine the position of the target. Generally, monopulse techniques can resolve target position to about one tenth of the beamwidth of the radar beams.

SUMMARY

Embodiments of the present invention are directed to synthesizing an elevation monopulse antenna for azimuth connected phase array antennas, radar systems including the same, and methods thereof. According to the embodiments, a monopulse antenna is configured by using a thinned top antenna and a thinned bottom antenna created by assigning suitable element weights to a number of sub-arrays that are connected for azimuth detection only. The thinned top antenna and the thinned bottom antenna form two virtual antennas that have phase centers that differ in a height direction (elevation).

In some embodiments, the sub-arrays may be connected for elevation detection only, but the monopulse antenna may be configured by using a thinned left antenna and a thinned right antenna created by assigning suitable element weights to the sub-arrays. The thinned left antenna and the thinned right antenna form two virtual antennas that have phase centers that differ in an azimuth direction. However, one skilled in the art will understand that the present invention is not limited to the illustrated directions. To the contrary, the antenna, radar system, and method as embodied in the present invention may be operated in other suitable directions.

In one embodiment, an antenna array includes a plurality of sub-arrays operatively arranged in a first direction, each of the sub-arrays including a plurality of antenna elements grouped as a first group and a second group adjacent to each other in a second direction substantially perpendicular to the first direction; and a plurality of transmit/receive (T/R) modules respectively coupled to the plurality of antenna elements. The T/R modules are configured to perform monopulse processing by enabling the antenna elements of the first groups and disabling the antenna elements of the second groups of a plurality of first sub-arrays from among the plurality of sub-arrays to form a first monopulse antenna, and enabling the antenna elements of the second groups and disabling the antenna elements of the first groups of a plurality of second sub-arrays from among the plurality of sub-arrays to form a second monopulse antenna.

In another embodiment, a method for operating a monopulse radar system is provided. The monopulse radar system includes an antenna array having a plurality of sub-arrays operatively arranged in a first direction, and each of the sub-arrays includes a plurality of antenna elements. The method includes grouping the antenna elements of each sub-array as a first group and a second group adjacent to each other in a second direction perpendicular to the first direction; enabling the antenna elements of the first groups and disabling the antenna elements of the second groups of first sub-arrays from among the plurality of sub-arrays to form a first monopulse antenna; enabling the antenna elements of the second groups and disabling the antenna elements of the first groups of second sub-arrays from among the plurality of sub-arrays to form a second monopulse antenna; and performing monopulse processing to detect a position of a target in the second direction using the first monopulse antenna and the second monopulse antenna.

In one embodiment, the first direction may be an azimuth direction, and the second direction may be an elevation direction. In another embodiment, the first direction may be an elevation direction, and the second direction may be an azimuth direction.

BRIEF DESCRIPTION OF THE DRAWINGS

The above and other features and aspects of the present invention will become more apparent as described in detail embodiments thereof with reference to the attached drawings in which.

DETAILED DESCRIPTION OF EMBODIMENTS

Figure 1:
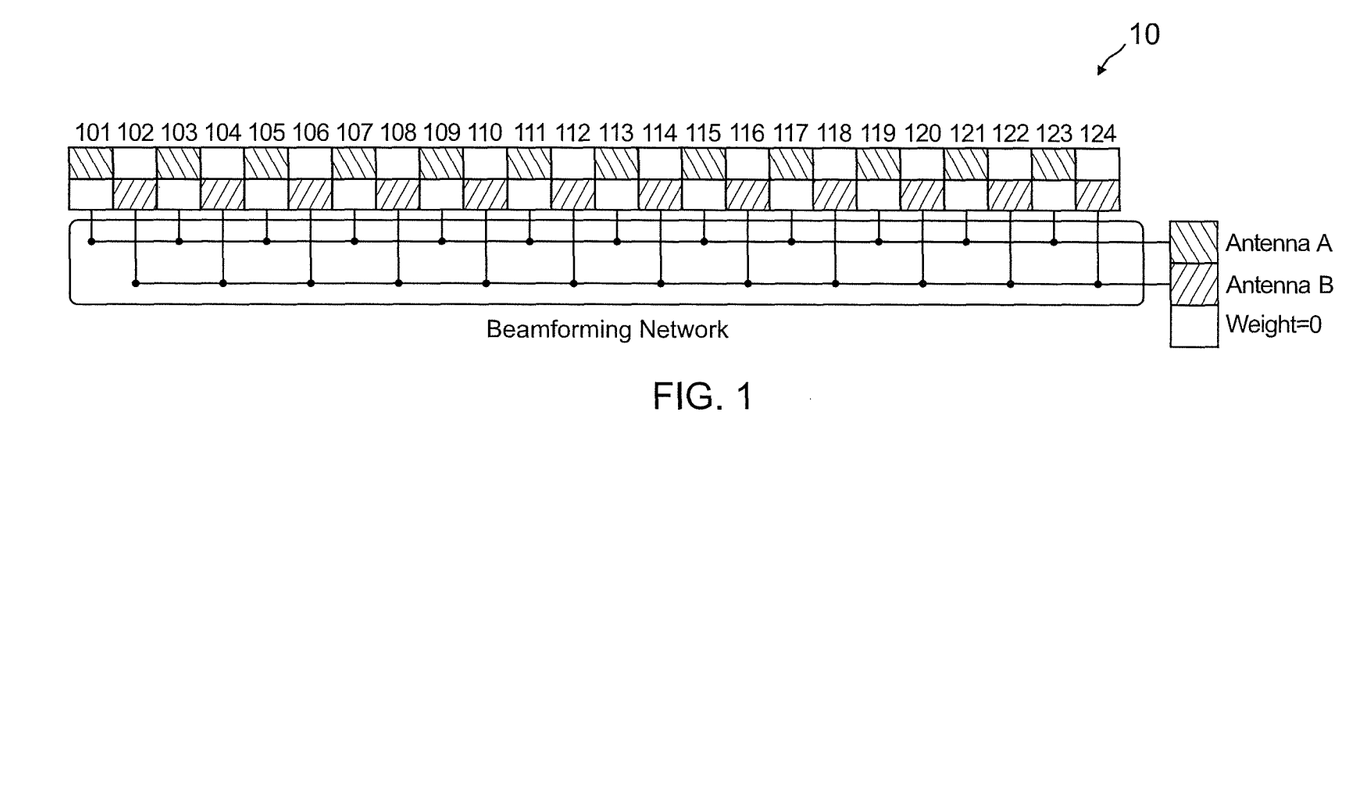
FIGS. 1-2 are drawings conceptually illustrating an antenna array including a number of sub-arrays operatively arranged, and virtually creating two antennas by weighing individual antenna elements of each sub-array during receive, and summing the sub-arrays in a beamforming network.
Figure 2:
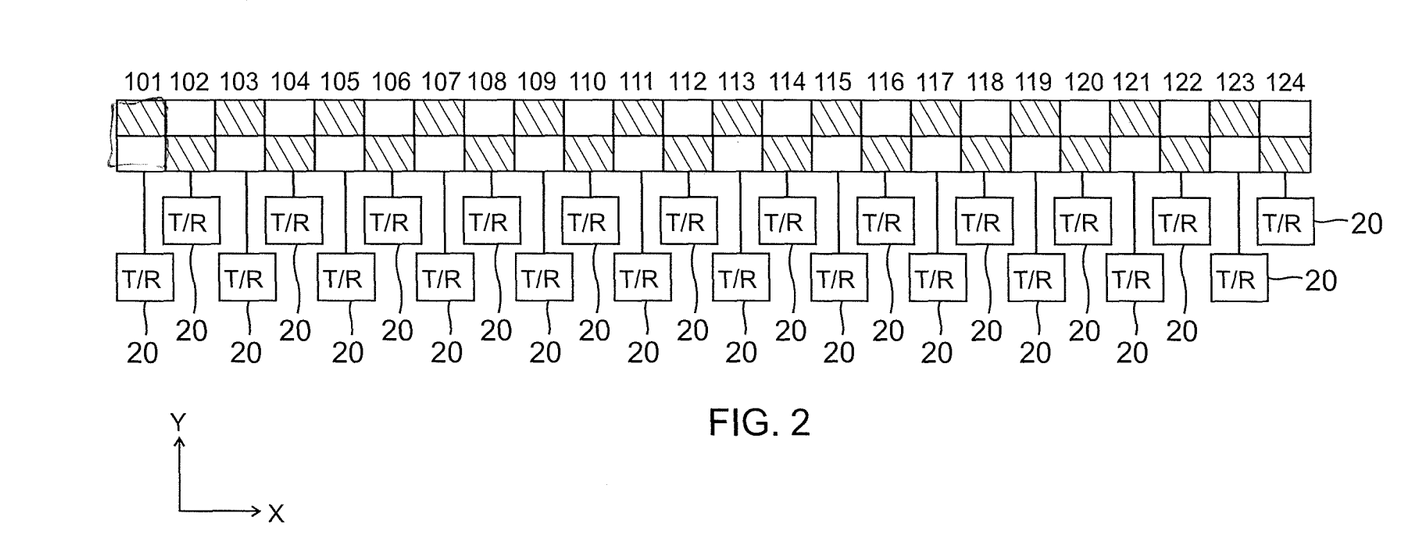

FIGS. 1-2 show embodiments of the present invention directed to operating the antenna array that is generally configured in the whole-beam detection mode in one direction (e.g., azimuth), to synthesize a monopulse antenna in another direction (e.g., elevation). In one embodiment, a monopulse antenna in the elevation direction can be synthesized using an azimuth-connected antenna array. According to another embodiment, a monopulse antenna in the azimuth direction can be synthesized using an elevation-connected antenna array. Hereinafter, the present invention will be illustrated in several non-limiting embodiments.

FIGS. 1-2 are drawings conceptually illustrating an antenna array 10 including a number of sub-arrays (101, 102, . . . , 124) operatively arranged in an azimuth-only direction (X direction) according to an embodiment of the present invention. For example, the antenna array 10 can be an azimuth beamforming network. Each of the sub-arrays (101, 102, . . . , 124) is weighted to form "thinned" antennas having different phase centers by enabling or disabling the different antenna elements. The term "thinned antenna" refers to an antenna where some elements are absent or off (e.g., disabled).

Figure 3:
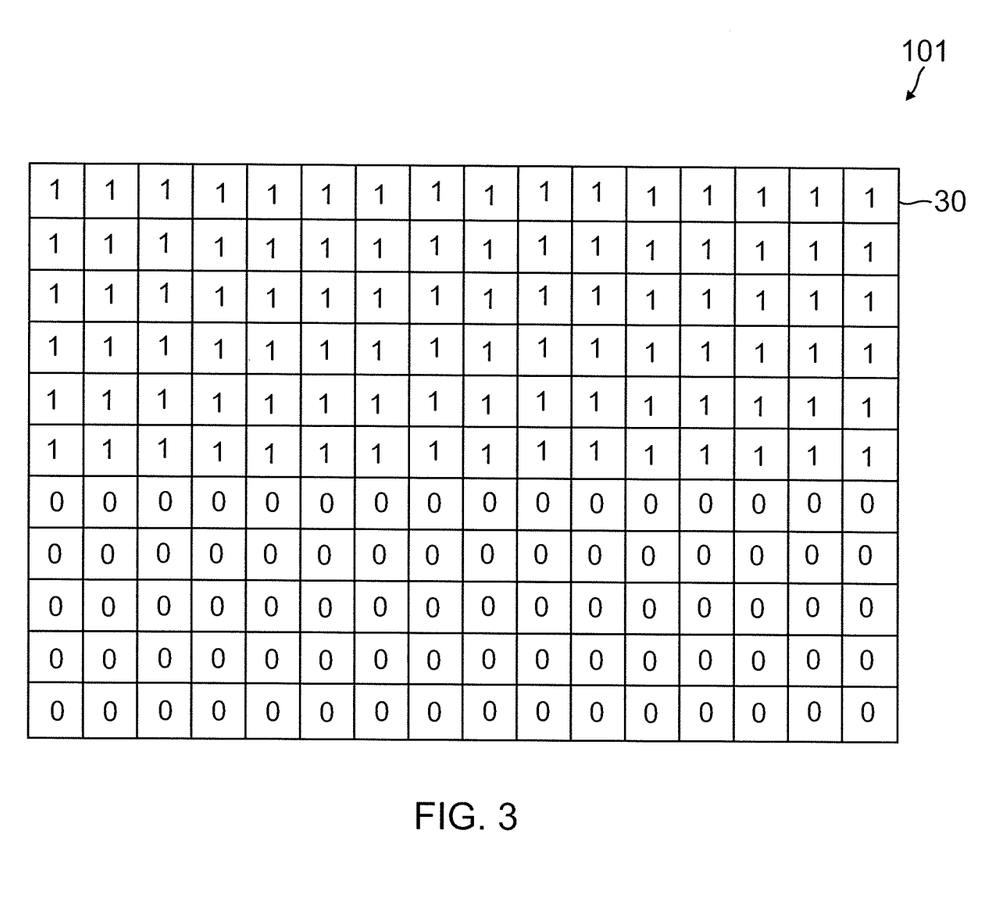
FIG. 3 is a drawing conceptually illustrating the sub-array of FIGS. 1-2, with the upper portion weighed to be active and the lower portion weighed to be inactive.

Referring to FIG. 2, each of the sub-arrays (101, 102, . . . , 124) include a number of antenna elements 30 (see FIG. 3) respectively driven by a number of transmit and receive (T/R) modules 20. In some embodiments, each T/R module can drive a single antenna element, and in other embodiments, each T/R module can drive multiple antenna elements. Different weights can be assigned to the T/R modules 20. Therefore, each antenna element 30 can be controlled individually by controlling the weights assigned to the T/R modules 20. For example, FIG. 3 is a drawing conceptually illustrating the sub-array 101 as a non-limiting example. The sub-array 101 includes a number of antenna elements 30 arranged in a matrix form in which some of the antenna elements 30 are active or enabled (denoted as "1") while some of the antenna elements 30 are inactive or disabled (denoted as "0"). For example, in FIG. 3, the antenna elements 30 in the upper portion of the sub-array 101 are active, whereas the antenna elements 30 in the lower portion of the sub-array 101 are inactive. Therefore, the upper portion is weighted as the phase center in sub-array 101.

Still referring to FIGS. 2 and 3, a thinned monopulse antenna pair is arranged as top and bottom antennas (elevation direction). The top antenna can be synthesized by enabling the antenna elements 30 (active) at the upper portion and disabling the antenna elements 30 (inactive) at the lower portion of a first group of the sub-arrays, and the bottom antenna can be synthesized by enabling (active) the antenna elements 30 at the bottom portion and disabling (inactive) the antenna elements 30 at the upper portion of a second group of the sub-arrays. A weight of zero can be assigned to the T/R module 20 to set the corresponding antenna element 30 in an inactive state. For example, in FIG. 2, the top antenna (antenna A) includes the odd sub-arrays (101, 103, . . . , 123), and the bottom antenna (antenna B) includes the even sub-arrays (102, 104, . . . , 124). In each of the odd sub-arrays, the antenna elements 30 located at the upper half of sub-array are enabled while the antenna elements 30 located at the lower half of the sub-array are disabled. In each of the even sub-arrays, the bottom half of the antenna elements 30 are enabled while the upper half of the antenna elements 30 are disabled. Accordingly, a thinned monopulse antenna pair (A and B) on top and bottom with phase centers that differ in height (elevation), are synthesized. Here, the enabled (active) antenna elements 30 are alternately arranged. The beamwidth (azimuth and elevation) of the thinned monopulse antenna pair is substantially the same as the unthinned array. The above synthesized monopulse antenna pair can perform an elevation estimate while no additional beam-former channels for monopulse processing in the elevation direction is needed.

In operating the radar system for monopulse processing according to an embodiment of the present invention, the antenna array is configured to transmit using the full sub-arrays (e.g., both upper and lower portions of each sub-array), and receive using just half of each of the sub-arrays (e.g., either the upper portion or the lower portion of each sub-array as shown in FIG. 2). Thus, the antenna array has a virtual top and a virtual bottom antenna during receive to determine the elevation of a detected target.

Figure 4:
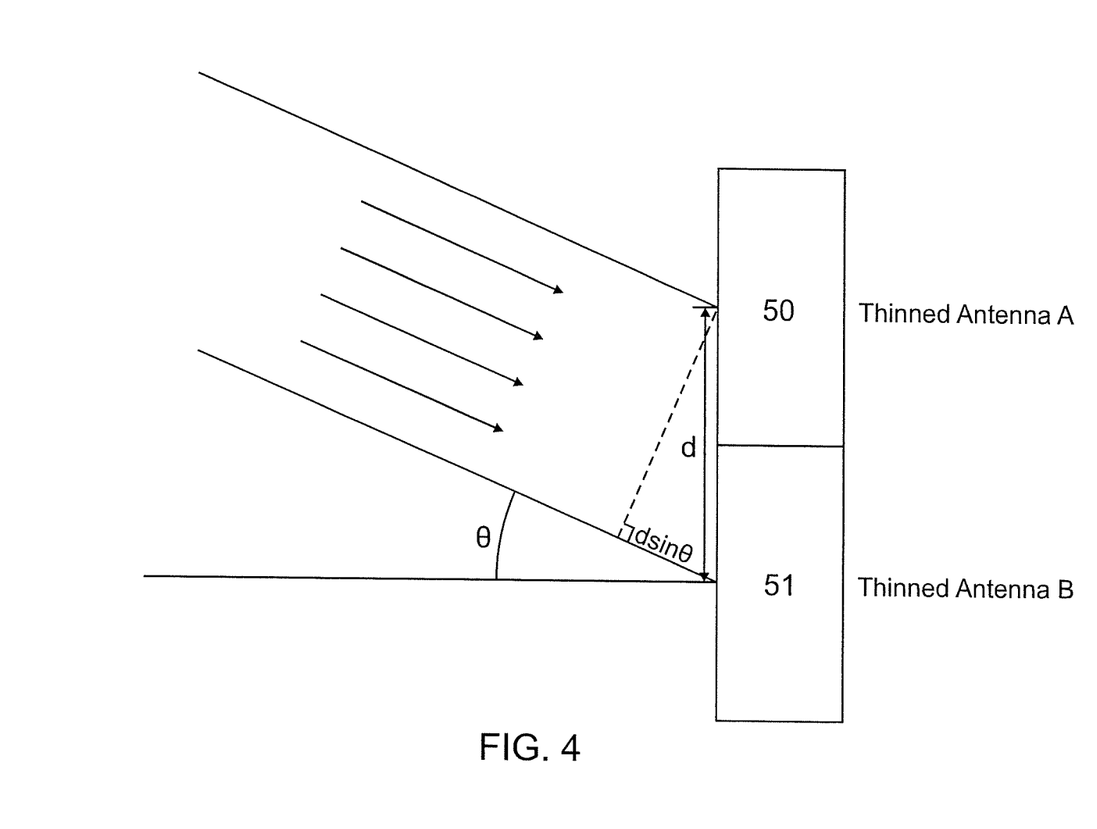
FIG. 4 shows an example side view of two thinned antenna sub-arrays with differing phase centers in a vertical direction receiving a return signal that can be used for elevation monopulse.

FIG. 4 shows a side view of two antenna sub-arrays receiving a return signal when the antenna is used as an elevation monopulse antenna. The return signal travels a different distance to arrive at the top antenna 50 compared with the distance that the return signal travels to arrive at the bottom antenna 51. Therefore, this difference in distance is manifested as a difference in received phases between the top and bottom antennas. This phase difference is used to estimate the elevation angle θ to the target. For example, a typical monopulse implementation forms a ratio, $$AngleEstimate(\theta) = \frac{|\Delta \cdot \Sigma|}{|\Sigma|^2},$$

using a complex difference and complex sum of the signals from the top and bottom antennas, and uses that ratio to estimate the angle θ. The AngleEstimate θ is proportional to the angle θ, and Δ is the difference between the signals from antenna A and antenna B, and Σ is the sum of the signals from antenna A and antenna B.

However, one skilled in the art will understand that the present invention is not limited to the particular arrangement of the active and inactive antenna elements 30 of FIG. 2. In other embodiments, the sub-arrays may be operatively arranged in, for example, an elevation-only direction, and a thinned left and right monopulse antenna pair can be synthesized according to the principle illustrated in the embodiment of FIG. 2. Thus, according to the various embodiments of the present invention, an antenna array that generally scans and determines a target angle in one axis (e.g., azimuth) can be configured to also determine a target angle in a different axis (e.g., elevation) without having additional receiver channels (e.g., additional analog-to-digital converter channels). Consequently, the weight and complexity of the radar system can be reduced.

Figure 5:
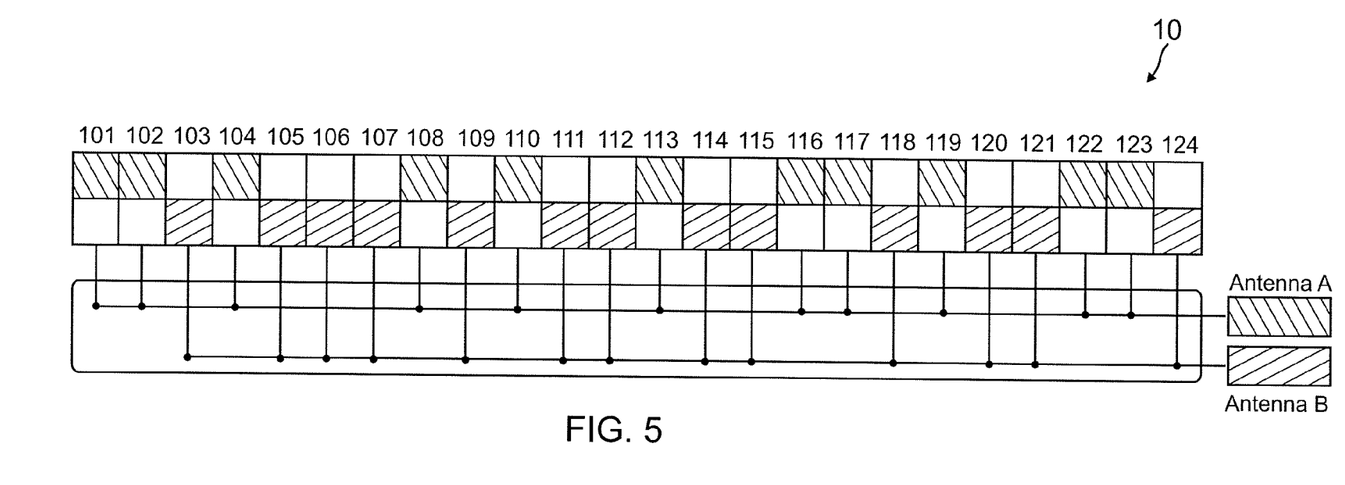
FIG. 5 is a drawing conceptually illustrating the antenna array of FIGS. 1-2 configured to form a pair of monopulse antennas according to another embodiment of the present invention.

FIG. 5 is a drawing conceptually illustrating the antenna array 10 of FIG. 2 configured to form a pair of monopulse antennas according to another embodiment of the present invention. In FIG. 5, the top antenna can be synthesized by enabling the antenna elements 30 (active) at the upper portion and disabling the antenna elements 30 (inactive) at the lower portion of a first group of the sub-arrays, and a bottom antenna can be synthesized by enabling the antenna elements 30 (active) at the bottom portion and disabling the antenna elements 30 (inactive) at the upper portion of a second group of the sub-arrays. For example, in FIG. 3, the top antenna (antenna A) includes the sub-arrays 101, 102, 104, 108, 110, 113, 116, 117, 119, 122, and 123, and the bottom antenna (antenna B) includes the sub-arrays 103, 105, 106, 107, 111, 112, 114, 115, 118, 120, 121, and 124. Accordingly, a thinned monopulse antenna pair (A and B) on top and bottom with phase centers that differ in height (elevation), are synthesized. However, different from the embodiment of FIG. 2, the active antenna elements 30 of this embodiment are not regularly distributed or arranged.

Figure 6:
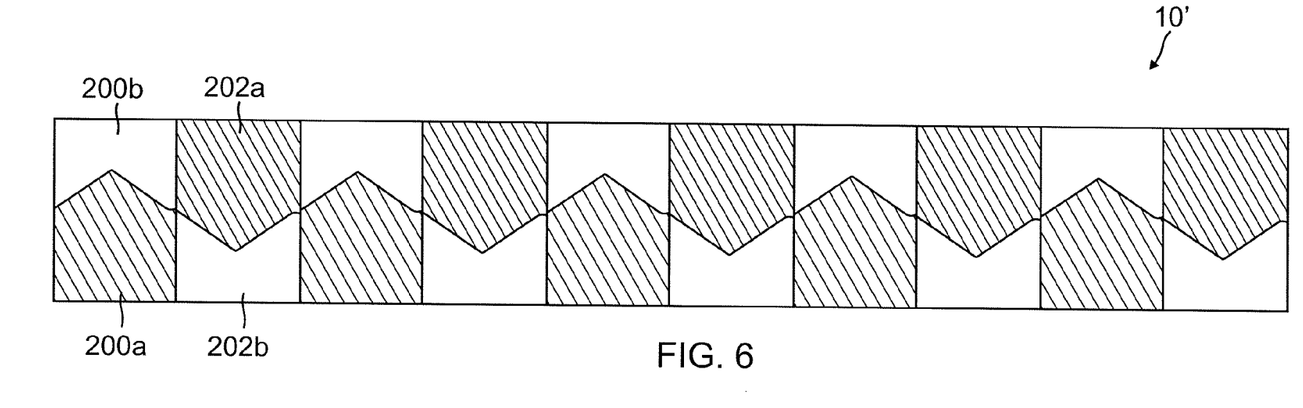
FIG. 6 is a drawing conceptually illustrating an antenna array configured to form a pair of monopulse antennas including a number of sub-arrays operatively arranged in one direction according to an embodiment of the present invention.

FIG. 6 is a drawing conceptually illustrating an antenna array 10' configured to form a pair of monopulse antennas including a number of sub-arrays 200 operatively arranged in only one direction (e.g., azimuth or elevation only) according to an embodiment of the present invention. Each of the sub-arrays 200 includes a number of antenna elements (e.g., FIG. 3) respectively driven by T/R modules. To synthesize a monopulse pair, the antenna elements at a lower portion of each odd sub-array 200 are set in an active or enabled state. In FIG. 6, a lower portion 200a of each odd sub-array including a number of the active antenna elements covers more than half of the total aperture area of the odd sub-array. That is, the lower portion 200a extends beyond the middle point of the odd sub-array, and the antenna elements at an upper portion 200b of the odd sub-array are set in an inactive state. The antenna elements can be set in the active or inactive state by controlling the weights of the T/R modules.

Similarly, an upper portion 202a of each even sub-array including a number of the active antenna elements covers more than half of the total aperture area of the even sub-array, and a lower portion 202b of each even sub-array covers less than half of the total aperture area of the even subarray. In this embodiment, the lower portions 200a of the odd sub-arrays and the upper portions 202a of the even sub-arrays overlap each other, for example, in the vertical (e.g., elevation) direction. This configuration may improve the sidelobes of the monopulse pair. The present invention, however, is not limited to the embodiment of FIG. 6. The upper portions 202a and the lower portions 200a can have other suitable shapes and sizes.

Figure 7:
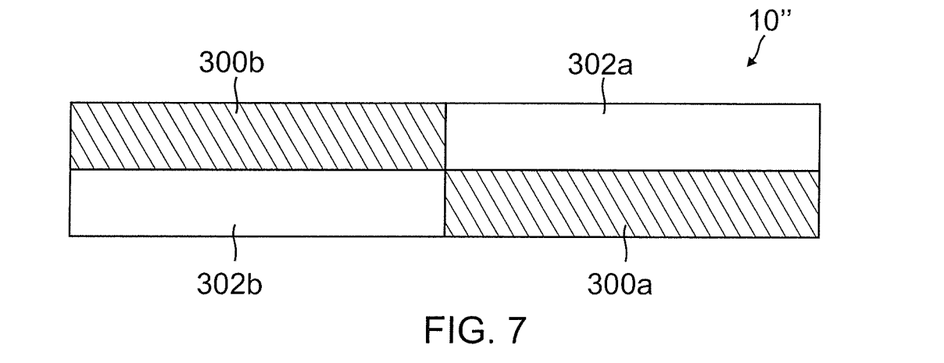
FIG. 7 is a drawing conceptually illustrating an antenna array configured to form a pair of monopulse antennas including a number of sub-arrays operatively arranged in one direction according to an embodiment of the present invention.

FIG. 7 is a drawing conceptually illustrating an antenna array 10'' configured to form a pair of monopulse antennas including a number of sub-arrays (not shown individually) operatively arranged in only one direction (e.g., azimuth or elevation only) according to an embodiment of the present invention. Each of the sub-arrays includes a number of antenna elements (e.g., FIG. 3) respectively driven by a number of T/R modules (not shown). To synthesize a monopulse pair, the antenna elements at the lower portion 300a of sub-arrays located at one side (e.g., right side) of the antenna array 10'' are set in an active or enabled state, and the antenna elements at the upper portion 300b of sub-arrays located at another side (e.g., left side) of the antenna array 10'' are set in an active or enabled state. The other antenna elements of the antenna array 10'' (e.g., the antenna elements located in other portions 302a, 302b) are set in an inactive state. Different from the embodiments of FIGS. 2, 5, and 7, instead of alternating active antenna elements, the antenna array 10'' can utilize the phase difference of two antennas at different heights to determine elevation.

Figure 8A:
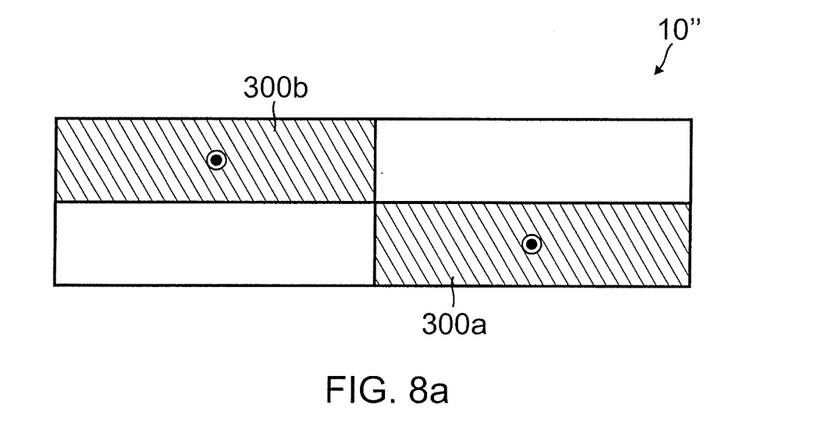
FIGS. 8*a* and 8*b* are drawings illustrating the phase centers of the antenna array of FIG. 5 according to embodiments of the present invention.
Figure 8B:
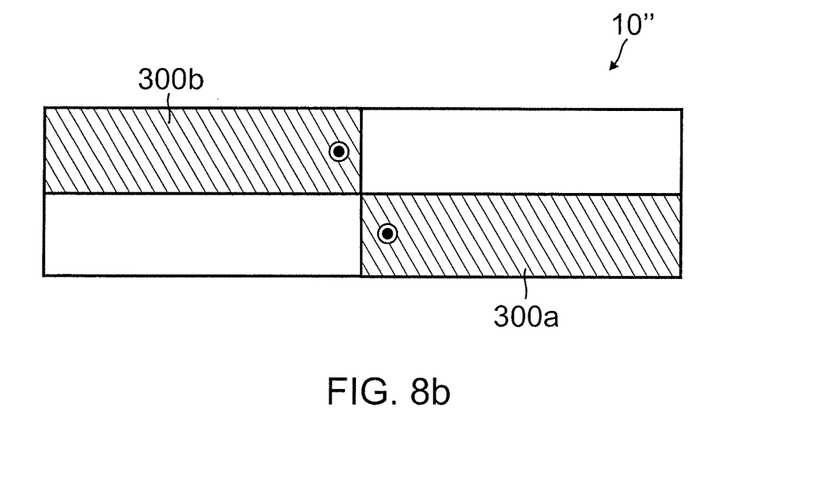

FIGS. 8a and 8b are drawings illustrating the phase centers of the antenna array 10'' of FIG. 7 according to embodiments of the present invention. In FIG. 8a, the phase centers of the upper antenna (300b) and lower antenna (300a) are at the center. The position of the phase center can be controlled by setting the weights of the T/R modules (not shown). In FIG. 8b, the phase centers are off-center and differently located among the upper and lower antennas. In more detail, the phase center of the upper antenna is located at the right end, but the phase center of the lower antenna is located at the left end. However, one skilled in the art will understand that the present invention is not limited thereto, and the phase centers of the antennas can be different in other embodiments.

Figure 9:
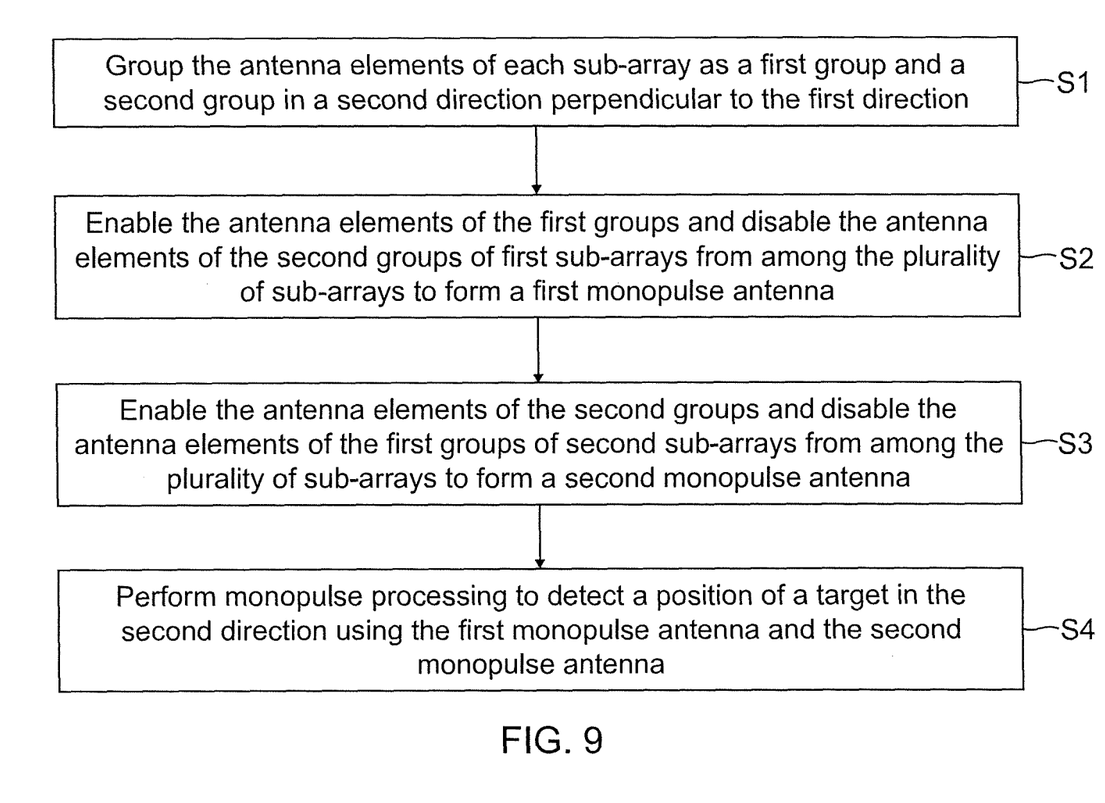
FIG. 9 is a flowchart illustrating a method for operating a monopulse radar system according to an embodiment of the present invention.

FIG. 9 is a flowchart illustrating a method for operating a monopulse radar system according to an embodiment of the present invention. The monopulse radar system includes an antenna array that has a number of sub-arrays operatively arranged in a first direction (e.g., azimuth or elevation), and each of the sub-arrays includes a number of antenna elements. In a first process (S1), the antenna elements of each sub-array are grouped as a first group and a second group adjacent to each other in a second direction perpendicular to the first direction. The sub-arrays are grouped as first sub-arrays and second sub-arrays. In a second process (S2), among the first sub-arrays, the antenna elements of the first groups are enabled, and the antenna elements of the second groups are disabled to form a first monopulse antenna. In a third process (S3), among the second sub-arrays, the antenna elements of the second groups are enabled, and the antenna elements of the first groups are disabled to form a second monopulse antenna. In a fourth process (S4), monopulse processing is performed to detect a position of a target in the second direction using the first monopulse antenna and the second monopulse antenna.

Figure 10:
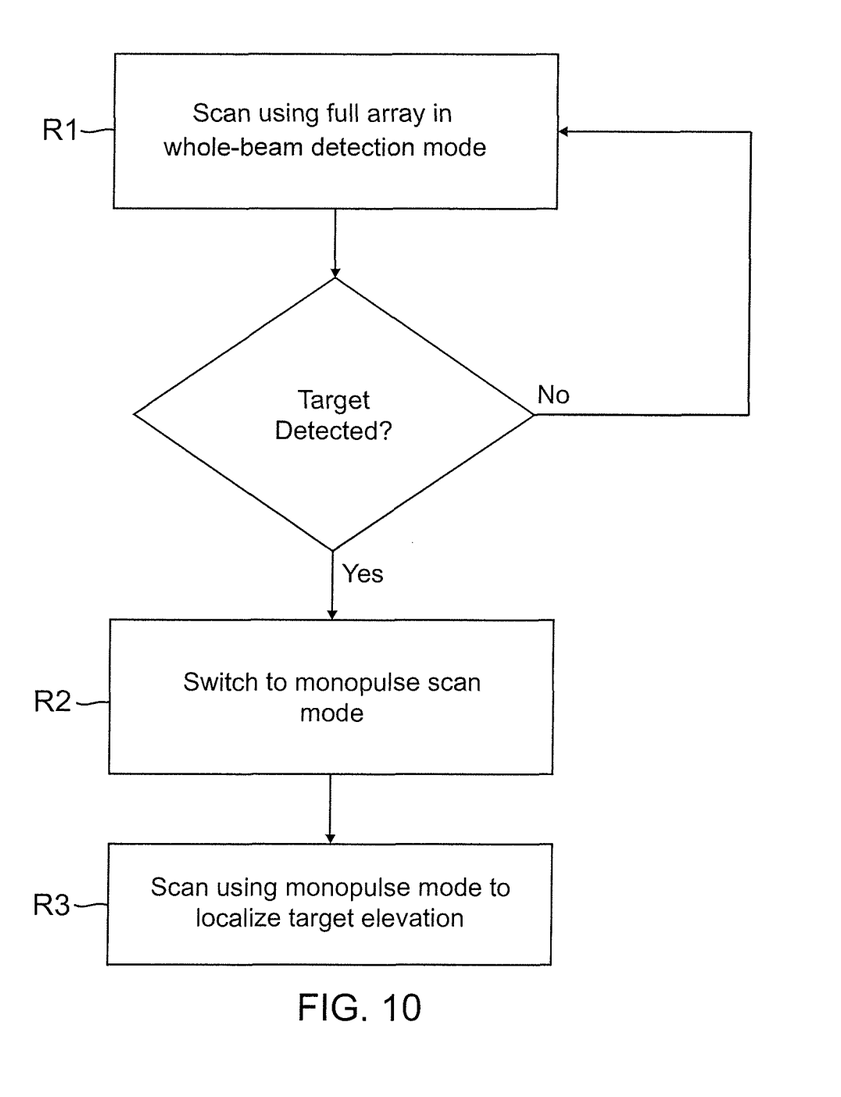
FIG. 10 shows flowchart illustrating a method of acquiring a target's azimuth and elevation using a whole-beam detection antenna capable of monopulse processing according to an embodiment of the present invention.

When the antenna array is operated in the monopulse mode, as described above, where the weighted half of the sub-array is used to receive the return signal, approximately 3 dB of the signal may be lost, thus potentially impacting the ability to detect targets at longer ranges. Therefore, FIG. 10 shows a flowchart illustrating a method of acquiring a target azimuth and elevation using a whole-beam detection antenna capable of monopulse processing for determining elevation while reducing the amount of time that the range of the radar is impacted by the signal loss. In an example application of the antenna array mounted on an aircraft configured for air-to-air searches, scan angles are empty of targets most of the time. Thus, in some embodiments, the antenna array operates using the full array in the whole-beam detection mode (e.g., non-monopulse mode) (R1) while scanning for a target. If a target is not detected, the antenna array continues to scan in the whole-beam detection mode. However, if a target is detected, the antenna array switches to the monopulse scan mode (R2), and localizes the target to determine the target elevation (R3) using a waveform that is more optimal for that target's parameters (e.g., target's velocity). Thus, only a small fraction of a radar's timeline is affected if the target has been detected.

In the above described embodiments, the process or method can perform the sequence of actions in a different order. In another embodiment, the process or method can skip one or more of the actions. In other embodiments, one or more of the actions are performed simultaneously or concurrently. In some embodiments, additional actions can be performed.

While the present invention has been particularly shown and described with reference to various embodiments, it will be understood by those of ordinary skill in the art that various changes in form and details may be made therein without departing from the spirit and scope of the present invention as defined by the following claims and their equivalents.

The invention claimed is:

1. A monopulse radar system comprising:
an antenna array comprising a plurality of sub-arrays operatively arranged in a first direction, each of the sub-arrays comprising a plurality of antenna elements grouped as a first group and a second group adjacent to each other in a second direction substantially perpendicular to the first direction;
a plurality of transmit/receive (T/R) modules; and
a processor,
the T/R modules of the plurality of T/R modules being respectively coupled to the plurality of antenna elements, and configured to enable the antenna elements of the first groups and to disable the antenna elements of the second groups of a plurality of first sub-arrays from among the plurality of sub-arrays to form a first monopulse antenna, and to enable the antenna elements of the second groups and to disable the antenna elements of the first groups of a plurality of second sub-arrays from among the plurality of sub-arrays to form a second monopulse antenna,
the processor being configured to perform monopulse processing to detect a position of a target in the second direction using the first monopulse antenna and the second monopulse antenna.

2. The monopulse radar system of claim 1, wherein the first sub-arrays and the second sub-arrays are alternately arranged in the first direction.

3. The monopulse radar system of claim 2, wherein the enabled antenna elements of the first monopulse antenna and the enabled antenna elements of the second monopulse antenna have different distribution patterns in the first direction.

4. The monopulse radar system of claim 1,
wherein when the antenna elements of the first groups are enabled and the antenna elements of the second groups are disabled, a number of the antenna elements of the first groups are greater than the antenna elements of the second groups, and
wherein when the antenna elements of the second groups are enabled and the antenna elements of the first groups are disabled, a number of the antenna elements of the second groups are greater than the antenna elements of the first groups.

5. The monopulse radar system of claim 1, wherein the antenna elements are enabled or disabled by controlling weights assigned to corresponding T/R modules, respectively.

6. The monopulse radar system of claim 1,
wherein the plurality of sub-arrays comprise a first group of sub-arrays and a second group of sub-arrays respectively located at opposite ends of the antenna array in the first direction, and
wherein the first monopulse antenna comprises the antenna elements of the first group of sub-arrays, and the second monopulse antenna comprises the antenna elements of the second group of sub-arrays.

7. The monopulse radar system of claim 6, wherein the first monopulse antenna and the second monopulse antenna have different phase centers.

8. The monopulse radar system of claim 6, wherein at least one of the first monopulse antenna or the second monopulse antenna has an off-center phase center.

9. The monopulse radar system of claim 1, wherein the T/R modules are configured to transmit a radar signal to detect a target in a first direction using all of the antenna elements, and after the target is detected, the T/R modules are reconfigured to perform a monopulse scan using the first monopulse antenna and the second monopulse antenna to determine a position of the target in the second direction.

10. The monopulse radar system of claim 1, wherein the first monopulse antenna and the second monopulse antenna overlaps each other in the first direction.

11. A method for operating a monopulse radar system comprising an antenna array having a plurality of sub-arrays operatively arranged in a first direction, each of the sub-arrays comprising a plurality of antenna elements, the method comprising:
grouping the antenna elements of each sub-array as a first group and a second group adjacent to each other in a second direction perpendicular to the first direction;
enabling the antenna elements of the first groups and disabling the antenna elements of the second groups of first sub-arrays from among the plurality of sub-arrays to form a first monopulse antenna;
enabling the antenna elements of the second groups and disabling the antenna elements of the first groups of second sub-arrays from among the plurality of sub-arrays to form a second monopulse antenna; and
performing monopulse processing to detect a position of a target in the second direction using the first monopulse antenna and the second monopulse antenna.

12. The method of claim 11, further comprising alternately arranging first sub-arrays and second sub-arrays of the plurality of sub-arrays in the first direction.

13. The method of claim 12, wherein the enabled antenna elements of the first monopulse antenna and the enabled antenna elements of the second monopulse antenna have different distribution patterns in the first direction.

14. The method claim 11,
wherein when the antenna elements of the first groups are enabled and the antenna elements of the second groups are disabled, a number of the antenna elements of the first groups are greater than the antenna elements of the second groups, and
wherein when the antenna elements of the second groups are enabled and the antenna elements of the first groups are disabled, a number of the antenna elements of the second groups are greater than the antenna elements of the first groups.

15. The method of claim 11, further comprising controlling weights of T/R modules to enable or disable corresponding antenna elements.

16. The method of claim 11,
wherein the plurality of sub-arrays comprise a first group of sub-arrays and a second group of sub-arrays respectively located at opposite ends of the antenna array in the first direction, and
wherein the first monopulse antenna comprises the antenna elements of the first group of sub-arrays, and the second monopulse antenna comprises the antenna elements of the second group of sub-arrays.

17. The method of claim 16, wherein the first monopulse antenna and the second monopulse antenna have different phase centers.

18. The method of claim 16, wherein at least one of the first monopulse antenna or the second monopulse antenna has an off-center phase center.

19. The method of claim 11, further comprising transmitting a radar signal to detect the target using all antenna elements of the plurality of sub-arrays, and after the target is detected, performing a monopulse scan using the first monopulse antenna and the second monopulse antenna to determine a position of the target in the second direction.

20. The method of claim 11, wherein the first monopulse antenna and the second monopulse antenna overlap each other in the first direction.

21. The method of claim 11, further comprising scanning for the target using the antenna array in a whole-beam detection mode, wherein the performing the monopulse processing to detect the position of the target in the second direction is performed in response to detecting the target.

22. The method of claim 21, wherein the whole-beam detection mode comprises using both the first group and the second group of the antenna elements of each sub-array.

* * * * *